US006942196B1

(12) United States Patent
Andrews

(10) Patent No.: US 6,942,196 B1
(45) Date of Patent: Sep. 13, 2005

(54) ELECTRICAL AUTOMOBILE CAR JACK

(76) Inventor: Kevin Andrews, P.O. Box 176, Franklin, GA (US) 30217

( * ) Notice: Subject to any disclaimer, the term of this patent is extended or adjusted under 35 U.S.C. 154(b) by 22 days.

(21) Appl. No.: 10/639,365

(22) Filed: Aug. 12, 2003

(51) Int. Cl.[7] .................................................. B60P 1/48
(52) U.S. Cl. ........................ 254/9 B; 254/8 B; 254/127
(58) Field of Search ................................ 254/124, 127, 254/8 R, 8 B, 8 C, 9 R, 9 B, 9 C, 95, 97

(56) References Cited

U.S. PATENT DOCUMENTS

| | | | | |
|---|---|---|---|---|
| 1,514,893 | A | 11/1924 | Carlson | |
| 2,974,929 | A * | 3/1961 | Day | 254/8 B |
| 3,347,523 | A | 10/1967 | Hankey et al. | |
| 3,451,655 | A | 6/1969 | Scott | |
| 3,645,501 | A | 2/1972 | Musgrove | |
| 3,997,143 | A | 12/1976 | Rose | |
| 4,055,329 | A | 10/1977 | Hammond | |
| 4,749,169 | A | 6/1988 | Pickies | |
| 4,750,712 | A * | 6/1988 | Genovese | 254/122 |
| 4,882,932 | A | 11/1989 | Corghi | |
| 4,955,450 | A | 9/1990 | Deinlein-Kalb et al. | |
| 5,211,375 | A | 5/1993 | Wang | |
| 5,657,964 | A | 8/1997 | Yoshida | |
| 5,707,043 | A | 1/1998 | Yoshida | |
| 6,161,816 | A | 12/2000 | Kikuchi | |
| 6,474,624 | B2 * | 11/2002 | Sawano | 254/8 B |

* cited by examiner

*Primary Examiner*—Jacob K. Ackun, Jr.
(74) *Attorney, Agent, or Firm*—Greg O'Bradovich, P.C.

(57) ABSTRACT

In general, an electrically operated car jack is described. A typical embodiment includes a base frame or housing that is adapted to be placed on the ground underneath the automobile to be lifted. The housing includes motors connected to drive arms connected to a load bridge and plate. The bridge is typically mounted within the drive arms by rods located within slots on the arms enabling the bridge to move upward and downward while being retained within the drive arms. Typically, the motors are operated by the car's battery. The drive arms typically include drive wheels that rotate oppositely and are coupled together by a coupler in an X-configuration that assures the coupler moves uniformly. The motors drive the arms, lifting and lowering the load bridge which lifts and lowers the automobile. The jack can be operated by remote control.

19 Claims, 3 Drawing Sheets

ELECTRICAL AUTOMOBILE CAR JACK

BACKGROUND

I. Field of the Invention

The present invention relates generally to the field of load bearing systems accessories, and more particularly to an electrical automobile apparatus and system.

II. Description of the Related Art

In general, presently available car jacks and other load bearing devices require manual physical labor to operate the jacks. These presently available jacks further require the operator to remain in a prolonged bent or squatting position to operate the jack.

SUMMARY

In general, an electrically operated car jack is described. A typical embodiment includes a base frame or housing that is adapted to be placed on the ground underneath the automobile to be lifted. One or more electric motors are connected to drive arms that are connected to a load bridge having a load plate that can be placed on the car's frame. Typically, the motors are operated by connecting electrical cords to the motors and to the car's battery. Each of the drive arms typically include drive wheels that can be sprockets to which a belt or chain, used as a coupler, can be connected in an X-configuration. The drive wheels typically rotate opposite each other and therefore the X-configuration assures that the coupler moves in a uniform direction. The motors drive the drive arms therefore lifting and lowering the load bridge which lifts and lowers the car on and off the ground. The bridge is typically mounted within the drive arms by rods located within elongated slots on the drive arms so that the bridge is able to move upward and downward and yet be retained within the drive arms. The entire jack can be operated by a remote control.

In general, in one aspect, the invention features a load-bearing apparatus, including a generally hollow external housing, a fist drive shaft located at one end of the housing, a second drive shaft located at another end of the housing opposite to and generally parallel to the first drive shaft, a first drive arm having tongs and connected to the first drive shaft, a second drive arm having tongs and connected to the second drive shaft and an elongated bridge having a first end connected between the tongs of the first drive arm and a second end connected between the tongs of the second drive arm.

In one implementation, the apparatus further includes a first electric motor coupled to the first drive shaft.

In another implementation, the apparatus further includes a second electric motor coupled to the second drive shaft drive shaft.

In another implementation, the apparatus further includes a first drive wheel connected to an end of the first drive shaft and a second drive wheel connected to an end of the second drive shaft.

In another implementation, the apparatus further includes a chain having a first end and a second end, the first end of the chain being connected at a point on the perimeter of the first drive wheel and the second end of the chain being connected at a point on the perimeter of the second drive wheel.

In still another implementation, the apparatus includes a belt connected to the drive wheels in an X configuration.

In yet another implementation, the drive wheels are sprockets.

In another implementation, the chain is connected to the in an X configuration.

In another implementation, each of the first and second drive arms comprise a base a two generally parallel tongs, each tong having an elongated slot along a length of the tong.

In another implementation, the elongated bridge further comprises a first channel through the first end and a second channel through the second end.

In another implementation, the apparatus includes a first rod located within the first channel, the first rod being longer than the first channel so that the ends of the rod protrude from either side of the first channel and a second rod located within the second channel, the second rod being longer than the second channel so that the ends of the rod protrude from either side of the second channel.

In another implementation, the protruding ends of each of the rods are in slidable engagement with the slots on the tongs of each drive arm.

In another implementation, the apparatus further includes a load plate connected to the elongated bridge.

In another implementation, the apparatus further includes an opening on the housing from which the load plate generally protrudes.

In another aspect, the invention features a jack apparatus, including an external housing, a load bridge, a first drive section connected to the housing and a second drive section connected to the housing and opposed to the first drive section, wherein the load bridge is moveably connected to the first and second drive sections.

In another aspect, the invention features an automobile jack system including an external housing, a load bridge having a load plate, a first drive arm having generally parallel tongs and being connected to the housing, a second drive section having generally parallel tongs and being connected to the housing and opposed to the first drive section, wherein the load bridge is moveably connected between the tongs of the first and second drive arms, a motor connected to at least one of the first and second drive arms and a power source connected to the motor.

In one implementation, the system further includes a coupler connected between the first and second drive arms.

In another implementation, the power source is an automobile battery.

In another implementation, the system further includes a remote control coupled to the motor.

In another aspect, the invention features an electric automobile car jack kit, including a jack including a generally hollow external housing, a fist drive shaft located at one end of the housing, a second drive shaft located at another end of the housing opposite to and generally parallel to the first drive shaft, a first drive arm having tongs and connected to the first drive shaft, a second drive arm having tongs and connected to the second drive shaft, an elongated bridge having a first end connected between the tongs of the first drive arm and a second end connected between the tongs of the second drive arm, a power source adapted to be coupled to the to jack and further adapted to raise and lower the bridge and a control adapted to be connected to the jack and further adapted to remotely operate the jack.

One advantage of the invention is that it can be placed underneath an automobile then can be operated remotely and electrically while the operator stands comfortably away from the vehicle.

Another advantage of the invention is that it can be powered from presently available electrical power from the vehicle.

Another advantage of the invention is that it includes two drive sections that can be coupled together to stabilize the jack load.

Other objects, advantages and capabilities of the invention will become apparent from the following description taken in conjunction with the accompanying drawings showing the preferred embodiment of the invention.

DETAILED DESCRIPTION

Figure 1:
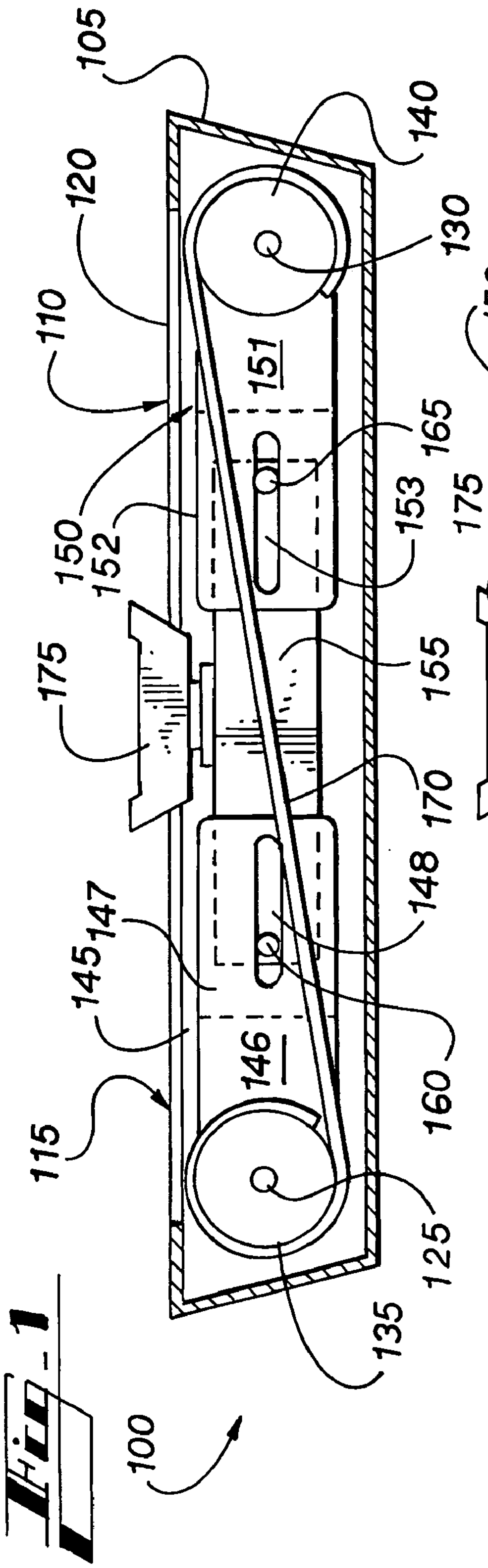
FIG. 1 illustrates a partial internal side view of an embodiment of an electric car jack in a first position.

Referring to the drawings wherein like reference numerals designate corresponding parts throughout the several figures, reference is made first to FIG. 1 that illustrates a partial internal side view of an embodiment of an electric jack 100 in a first position. The jack 100 typically includes a generally hollow external housing 105 having an opening 110 on the top of the housing 105. It is understood that the housing 105 can be enclosed or an open frame. The jack 100 further typically includes two opposed drive sections 115, 120. Each drive section 115, 120 generally includes a drive shaft 125, 130 coupled to a drive wheel 135, 140. The drive shafts 125, 130 are generally parallel to one another. Each drive section 115, 120 further includes a drive arm 145, 150. The drive arms 145, 150 generally include a base 146, 151 and tongs 147, 152 having elongated slots 148, 153 along a length of the tongs 147, 152.

The jack 100 can further include an elongated load bridge 155. One end of the bridge 155 is generally connected between the tongs 147 of the first drive arm 145 and the other end of the bridge 155 is generally connected between the tongs 151 of the second drive arm 150. In a typical embodiment, the bridge 155 includes a channel (see 156, 157 in FIG. 4 below) through each end of the bridge 155. A first rod 160 is located within the first channel 156, and is generally longer than the length of the first channel 156 so that the ends of the rod 160 protrude from either side of the first channel 156. Similarly, a second rod 165 is located within the second channel 157, and is generally longer than the second channel 157 so that the ends of the rod 165 protrude from either side of the second channel 157. In general, because the ends of the rods 160, 165 are longer than the channels 156, 157 and protrude from the channels 156, 157, the rods 160, 165 can be in engagement with the respective slots 148, 153 of the respective tongs 147, 152.

In a typical embodiment, the drive sections 115, 120 can be mechanically coupled together by coupling the drive wheels 135, 140. In a typical implementation, an elongated coupler 170, such as a belt, can be connected to the perimeter of both drive wheels 135, 140 so that the movement of one of the wheels 135, 140 drives the movement of the other one of the wheels 135, 140. In another embodiment, the coupler 170 can be a chain and the drive wheels 135, 140 can be sprockets having teeth that engage the chain. Use of a chain acts similarly to a belt. In either embodiment, the coupler 170 is configured in an X. This feature of the coupled drive sections 115, 120 is discussed in further detail below.

The jack 100 generally further includes a load plate 175 connected to the elongated bridge 155. The load plate 175 typically protrudes from the opening 120 on the housing 105.

The first position as shown in FIG. 1 illustrates a fully retracted or closed position in which the bridge 155 and the load plate 175 are retracted into the hollow housing 105.

Figure 2:
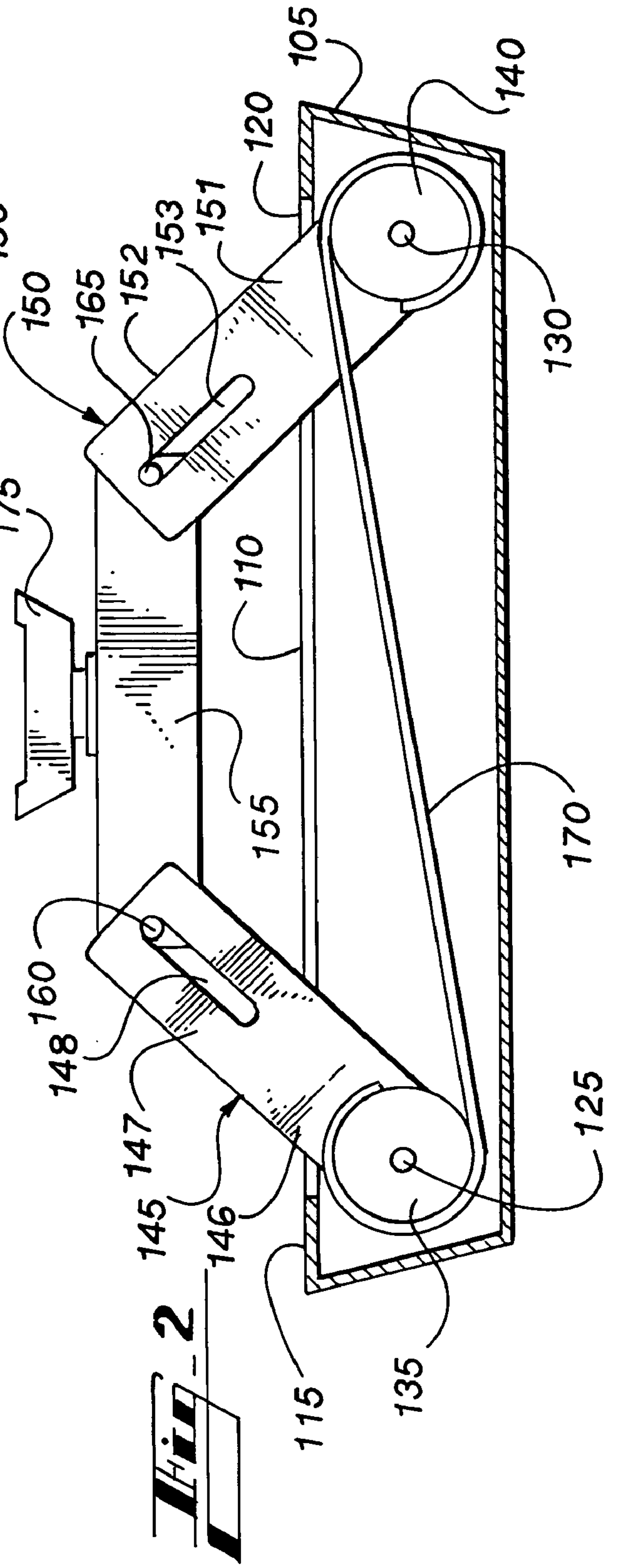
FIG. 2 illustrates a partial internal side view of an embodiment of an electric car jack in a second position.

FIG. 2 illustrates a partial internal side view of an embodiment of an electric car jack 100 in a second position. This second position is typically a fully protruded or open position in which the bridge 155 and the load plate 175 are fully protruded from the hollow interior of the housing 105. Typically, there are a spectrum of positions that the bridge 155 and the load plate 175 can take in between the fully retracted and the fully protruded positions.

As described above with respect to FIG. 1, the jack 100 typically includes a generally hollow external housing 105 having an opening 110 on the top of the housing 105, two opposed drive sections 115, 120 having a drive shaft 125, 130 coupled to a drive wheel 135, 140, a drive arm 145, 150, each having a base 146, 151 and tongs 147, 152 having elongated slots 148, 153 along a length of the tongs 147, 152. The jack 100 can further include an elongated load bridge 155 connected between the tongs 147 of the first drive arm 145 and the other end of the bridge 155 is generally connected between the tongs 151 of the second drive arm 150. The bridge 155 can include a channel (see 156, 157 in FIG. 4 below) having rods 160, 165. Typically, the rods 160, 165 can be in engagement with the respective slots 148, 153 of the respective tongs 147, 152. The drive sections 115, 120 can be mechanically coupled together by coupling the drive wheels 135, 140 with coupler 170 in an X-configuration. The jack 100 generally further includes a load plate 175 connected to the elongated bridge 155. The load plate 175 typically protrudes from the opening 120 on the housing 105.

Referring to FIGS. 1 and 2, it is illustrated that as the drive sections 115, 120 are energized, the drive wheels 135, 140 rotate which lifts and lowers the drive arms 145, 150. In general, whether the jack 100 is in a lifting or a lowering mode, there are several components of force that are asserted on the drive arms 145, 150, and generally on the drive sections 115, 120. As the bridge 155 and the load plate 175 are lifted and lowered, the force components are distributed generally along the rods 160, 165 as the rods 160, 165 move along the slots 148, 153. The movement of the rods 160, 165 along the slots 148, 153 help to keep the bridge 155, the load plate 175 and any load on the load plate 175 stabilized.

Furthermore, each of the drive sections 115, 120 can be independently energized or energized by the same source. Whether or not each drive section 115, 120 is independently energized, the coupler 170 helps to maintain and stabilize the bridge 155 and load plate 175 by coupling the drive sections 115, 120 to one another. Therefore, if the drive sections are being energized at different rates therefore lifting or lowering opposite sides of the bridge 155 at different rates, therefore potentially causing an imbalance on a load on the load plate 175, the coupler 170 prevents the drive sections 115, 120 from running at different rates by either back driving the faster of the sections 115, 120 of speeding up the slower of the sections 115, 120.

Furthermore, it is generally understood that the load on the load plate 175 asserts a downward force asserting a force at different points on the drive arms 145, 150. IT is well-known that the torque asserted on the drive arms 145, 150 is related to the length of the drive arms 145, 150, measured generally from the drive wheels 135, 140, multiplied by the force on the a rms. Therefore, the torque increases for greater loads and for longer lengths. Therefore, as the load is lifted, the point at which the force is asserted on the drive arms 145, 150 increases since the rods 160, 165 are moving along the slots 148, 153. Therefore, it is typically desirable to keep the length of the drive arms 145, 150 a length to generate torques that can be handled by the units that energize the drive sections 115, 120.

Figure 3:
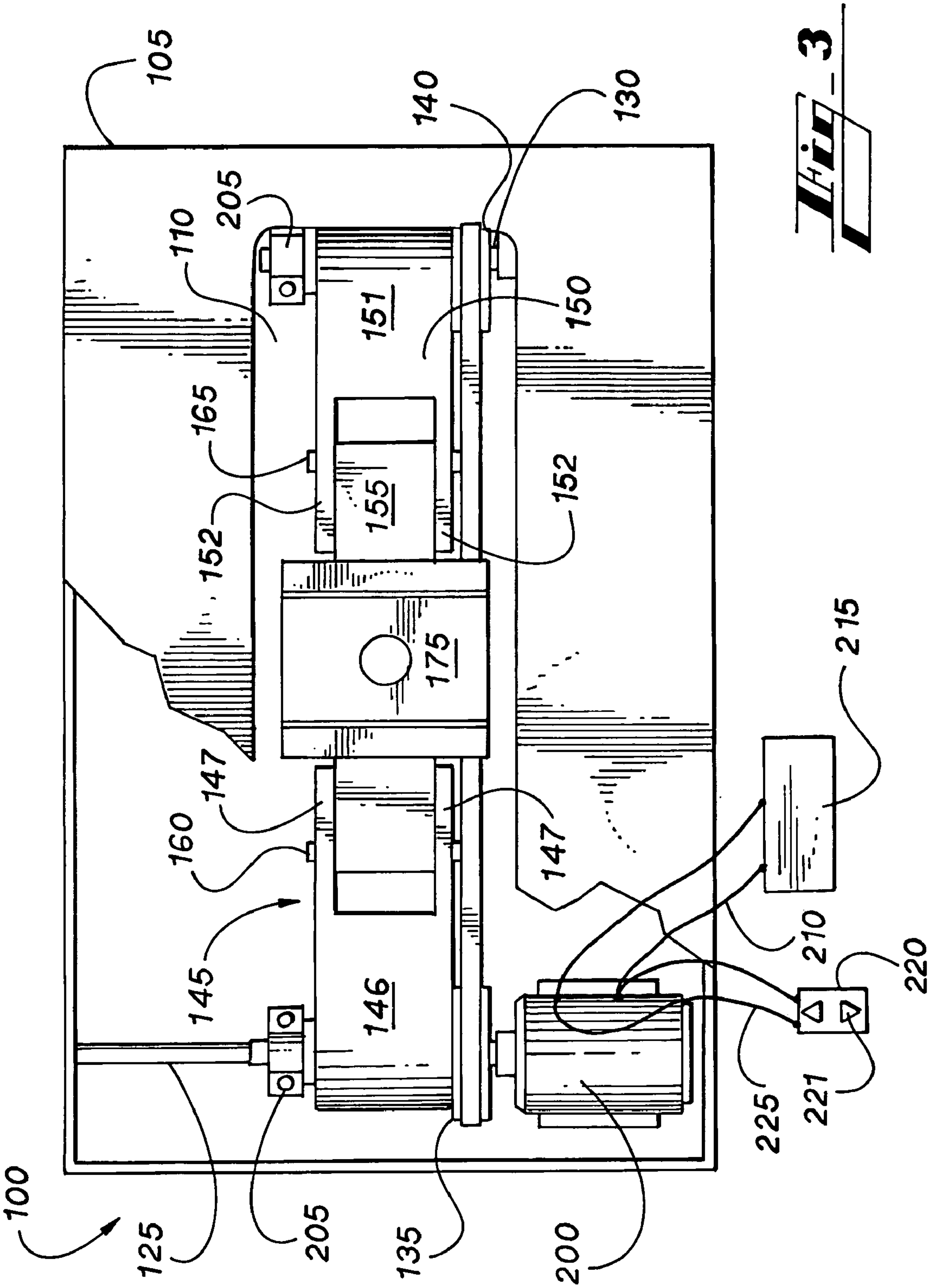
FIG. 3 illustrates a partial cutaway top view of an embodiment of an electric car jack.

FIG. 3 illustrates a partial cutaway top view of an embodiment of an electric car jack 100. As described above with respect to FIG. 1, the jack 100 typically includes a generally hollow external housing 105 having an opening 110 on the top of the housing 105, two opposed drive sections 115, 120 having a drive shaft 125, 130 coupled to a drive wheel 135, 140, a drive arm 145, 150, each having a base 146, 151 and tongs 147, 152 having elongated slots 148, 153 (see FIGS. 1 and 2 above) along a length of the tongs 147, 152. In a typical embodiment, the drive shafts 125, 130 can be elongated so that they can be connected to the housing 105 to further stabilize the drive sections 115, 120. Each drive section 115, 120 can include various nuts and washers 205 to connected the drive shafts 125, 130 to the drive arms 145, 150, typically at the bases 146, 151. Each drive section 115, 120 can further include an electrical motor 200 coupled to the drive arms 145, 150. The motors 200 are used to energize the drive sections 115, 120 as described above. In another embodiment, only one of the sections 115, 120 can include a motor. In either embodiment, the coupler 170 helps to couple and drive each drive section 115, 120 to each other. The motors 200 can typically be connected to the housing 105. In another embodiment, it is contemplated that other methods to energize the drive sections 115, 120 can be implemented, including but not limited to hydraulic motors.

The jack 100 can further include an elongated load bridge 155 connected between the tongs 147 of the first drive arm 145 and the other end of the bridge 155 is generally connected between the tongs 151 of the second drive arm 150. The bridge 155 can include a channel (see 156, 157 in FIG. 4 below) having rods 160, 165. Typically, the rods 160, 165 can be in engagement with the respective slots 148, 153 of the respective tongs 147, 152. The drive sections 115, 120 can be mechanically coupled together by coupling the drive wheels 135, 140 with coupler 170 in an X-configuration. The jack 100 generally further includes a load plate 175 connected to the elongated bridge 155.

In a typical embodiment, the jack 100 can further include electric power lines 210 that can be connected between the motors 200 and the automobile's car battery 215. A remote control 220 having control switches 221 can further be connected to the motor 200 to control the upward and downward motion of the jack 100. The control 220 can be connected to the motor 200 power cords 225 or have a remote connection such as, but not limited to, radio control.

Other suitable power sources other than the car battery can be implemented in other embodiments. For example, other power sources can include but are not limited to alternating current sources (e.g., 10 VAC, 220 VAC), direct current sources (e.g., 12 VDC), 24 V military, solar and the like.

Figure 4:
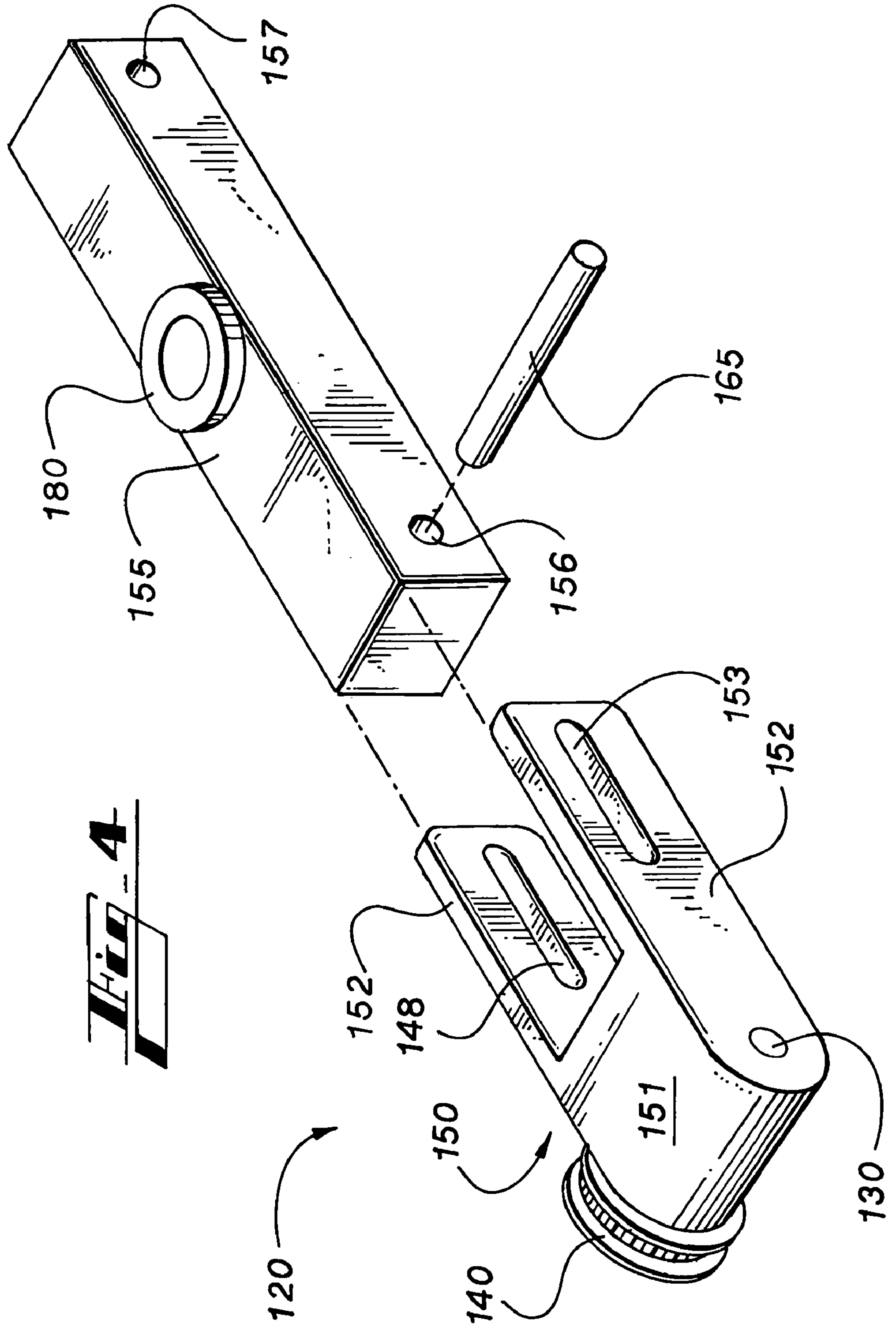
FIG. 4 illustrates components of an embodiment of an electric car jack.

FIG. 4 illustrates components of an embodiment of an electric car jack 100. The components are for the drive section 120 for illustrative purposes. The bridge 155 is shown with the channels 156, 157 and the rod 165 is shown adjacent the channel 156. The drive arm 150 having tongs 152 can be placed over the end of the bridge 155 and the rod 165 can be asserted through the slot 153 and the channel 56 to secure the tongs 152 to the bridge 155. The drive wheel 140 is shown detached from the coupler 170 and connected to the base 151 of the drive arm 150. A portion of the drive shaft 130 is also shown. The bridge 155 is shown detached from the load plate 175 to illustrate a connection point 180 that can allow the load plate 175 to be rotatably connected to the bridge 155.

In general, the embodiments described herein relate generally to load bearing lifting systems that can be used in a variety of sizes to lift various loads. A typical embodiment is used for an automobile jack. Other embodiments can be used for smaller loads such as, but not limited to, lifting beakers in chemistry experiments. It is understood that the embodiments can be modified in several ways for different uses and implementations.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A load-bearing apparatus, comprising:
a generally hollow external housing;
a fist drive shaft located at one end of the housing;
a second drive shaft located at another end of the housing opposite to and generally parallel to the first drive shaft;
a first drive arm having tongs and connected to the first drive shaft;
a second drive arm having tongs and connected to the second drive shaft; and
an elongated bridge having a first end connected between the tongs of the first drive arm and a second end connected between the tongs of the second drive arm.

2. The apparatus as claimed in claim 1 further comprising a first electric motor coupled to the first drive shaft.

3. The apparatus as claimed in claim 2 further comprising a second electric motor coupled to the second drive shaft drive shaft.

4. The apparatus as claimed in claim 1 further comprising:
a first drive wheel connected to an end of the first drive shaft; and
a second drive wheel connected to an end of the second drive shaft.

5. The apparatus as claimed in claim 4 further comprising a chain having a first end and a second end, the first end of the chain being connected at a point on the perimeter of the first drive wheel and the second end of the chain being connected at a point on the perimeter of the second drive wheel.

6. The apparatus as claimed in claim 5 further comprising a belt connected to the drive wheels in an X configuration.

7. The apparatus as claimed in claim 6 wherein the drive wheels are sprockets.

8. The apparatus as claimed in claim 7 wherein the chain is connected to the in an X configuration.

9. The apparatus as claimed in claim 1 wherein each of the first and second drive arms comprise a base a two generally parallel tongs, each tong having an elongated slot along a length of the tong.

10. The apparatus as claimed in claim 9 wherein the elongated bridge further comprises a first channel through the first end and a second channel through the second end.

11. The apparatus as claimed in claim 10 further comprising:

a first rod located within the first channel, the first rod being longer than the first channel so that the ends of the rod protrude from either side of the first channel; and a second rod located within the second channel, the second rod being longer than the second channel so that the ends of the rod protrude from either side of the second channel.

12. The apparatus as claimed in claim 11 wherein the protruding ends of each of the rods are in slidable engagement with the slots on the tongs of each drive arm.

13. The apparatus as claimed in claim 1 further comprising a load plate connected to the elongated bridge.

14. The apparatus as claimed in claim 13 further comprising an opening on the housing from which the load plate generally protrudes.

15. A car jack system comprising:

an external housing;

a load bridge having a load plate;

a first drive arm having generally parallel tongs and being connected to the housing;

a second drive arm having generally parallel tongs and being connected to the housing and opposed to the first drive section, wherein the load bridge is moveably connected between the tongs of the first and second drive arms;

a motor connected to at least one of the first and second drive arms; and a power source connected to the motor.

16. The system as claimed in claim 15 further comprising a coupler connected between the first and second drive arms.

17. The system as claimed in claim 15 wherein the power source is an automobile battery.

18. The system as claimed in claim 15 further comprising a remote control coupled to the motor.

19. An electric automobile car jack kit, comprising:

a jack including:

a generally hollow external housing;

a fist drive shaft located at one end of the housing;

a second drive shaft located at another end of the housing opposite to and generally parallel to the first drive shaft;

a first drive arm having tongs and connected to the first drive shaft;

a second drive arm having tongs and connected to the second drive shaft;

an elongated bridge having a first end connected between the tongs of the first drive arm and a second end connected between the tongs of the second drive arm;

a power source adapted to be coupled to the to jack and further adapted to raise and lower the bridge; and a control adapted to be connected to the jack and further adapted to remotely operate the jack.

* * * * *